(No Model.) 2 Sheets—Sheet 1.
H. E. GRABAU.
SURVEYING INSTRUMENT.
No. 472,451. Patented Apr. 5, 1892.
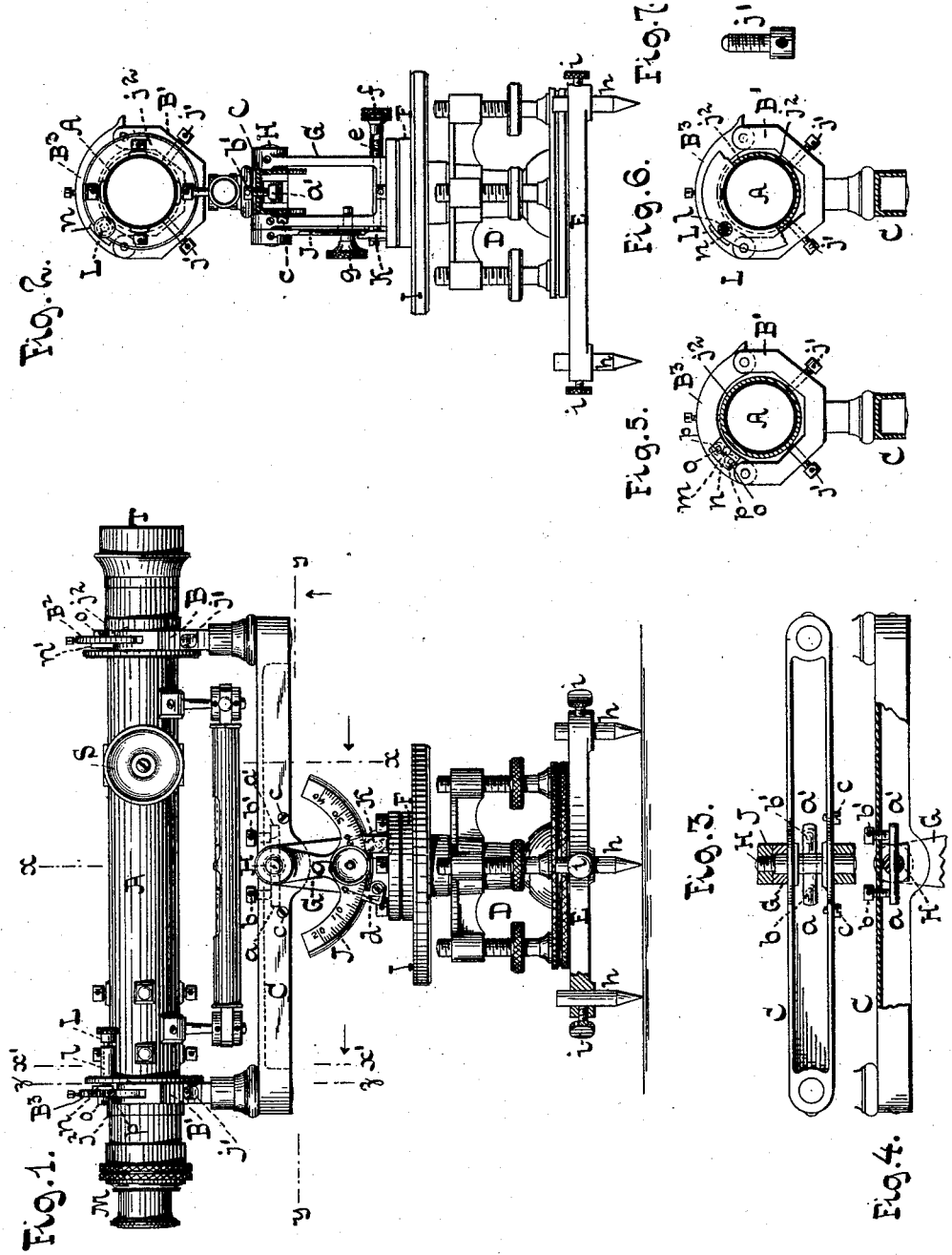
WITNESSES:
INVENTOR:
Hans E. Grabau,
BY A. Faber du Faur
his ATTORNEY (No Model.) 2 Sheets—Sheet 2.

H. E. GRABAU.
SURVEYING INSTRUMENT.

No. 472,451. Patented Apr. 5, 1892.

WITNESSES:
W. F. Bristol
A. Faber du Faur

INVENTOR:
Hans E. Grabau,
BY A. Faber du Faur Jr.
his ATTORNEY

UNITED STATES PATENT OFFICE.

HANS EDGAR GRABAU, OF NEW YORK, N. Y., ASSIGNOR OF ONE-HALF TO EDWARD G. SOLTMANN, OF SAME PLACE.

SURVEYING-INSTRUMENT.

SPECIFICATION forming part of Letters Patent No. 472,451, dated April 5, 1892.

Application filed April 4, 1891. Serial No. 387,629. (No model.)

*To all whom it may concern:*

Be it known that I, HANS EDGAR GRABAU, a citizen of the German Empire, and a resident of New York, in the county and State of New York, have invented certain new and useful Improvements in Surveying-Instruments, of which the following is a specification.

My invention has reference to improvements in surveying-instruments, and especially to engineers', builders', and architects' levels or transit-levels; and it consists in certain novel features in the construction of instruments of this class, as fully pointed out in the following specification and claims and illustrated in the accompanying drawings, in which—

Figure 9:
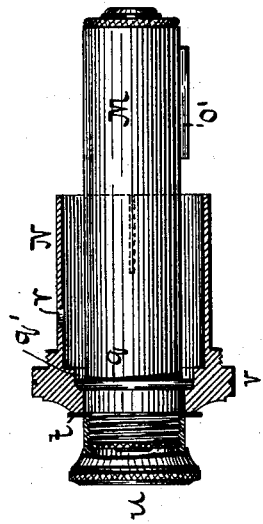
Figure 8:
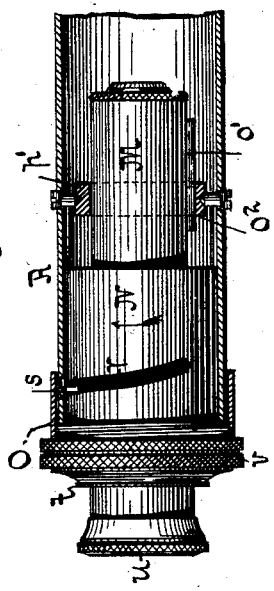
Figure 10:
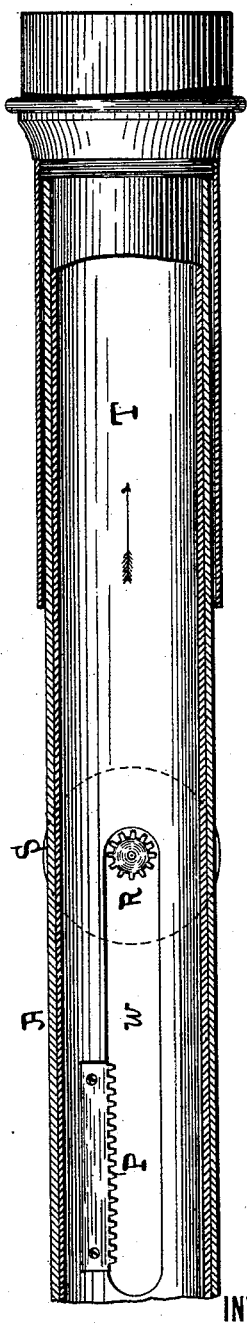

Figure 1 represents a side elevation of a surveying-instrument constructed according to my invention. Fig. 2 is a vertical section thereof in the plane $x$ $x$, Fig. 1. Fig. 3 is a horizontal section in the plane $y$ $y$, Fig. 1. Fig. 4 is a sectional elevation of the level-bar. Fig. 5 is a vertical section in the plane $z$ $z$, Fig. 1. Fig. 6 is a similar section in the plane $x'$ $x'$, Fig. 1. Fig. 7 is a detail view of one of the parts drawn to a larger scale than the preceding figures. Fig. 8 is a sectional elevation of the ocular end of the telescope. Fig. 9 is a sectional elevation of the mechanism for adjusting the eye-piece. Fig. 10 is a sectional elevation of the objective end of the telescope.

Similar letters indicate corresponding parts throughout the several views.

In the drawings, referring at present to Figs. 1 and 2, the letter A designates the telescope, supported in suitable Y's B and B', attached to the level-bar C. D is the leveling-head, E the wall-stand, and F the vertical spindle. To the top plate of the spindle is secured a U-shaped standard G, having bearings for a horizontal spindle H, upon which the level-bar C is mounted.

To the spindle H, Figs. 2, 3, and 4, are secured transverse fingers $a$ and $a'$, which are arranged to be engaged by vertical set-screws $b$ and $b'$, extending through the level-bar, whereby the level-bar can be adjusted in a vertical plane about the center of the spindle H in leveling the instrument and is rigidly held by the set-screws.

The spindle H can turn freely in its bearings in the standard G, and to limit its motion, so as to protect the horizontal limb I of the instrument, suitable stops are provided, such as the pins or screws $c$ $c$, arranged on the level-bar and adapted to engage the standard.

To the spindle H is secured a vertical graduated segment J, which measures, in conjunction with a zero-mark $d$ on the standard, the vertical angles, Fig. 1. The outer circumference of the segment is engaged by a clamp or brake K, which is operated by a screw-rod $e$, passing through the standard and engaged on its opposite end by a nut $f$. By the use of this clamp the telescope is held rigidly at the angle to which it may be set, owing to the long leverage through which said clamp acts.

To hold the limb at approximately right angles to the vertical center, a suitable pin $g$, passing through the segment J and entering the standard, may be used.

In case the instrument is to be used upon a wall or floor it is expedient to be able to set the telescope approximately level, and to this end I make the legs $h$ of the wall-stand adjustable within sockets in the stand, such legs being secured by screws, as $i$. Of course other equivalent means could be substituted.

To bring the telescope A in the direct center of the instrument, the Y B at the objective end of the telescope is provided with adjusting-screws $j'$ $j'$ on opposite sides, upon which a sleeve $j^2$ on the telescope rests. The screws are preferably provided with agate or other hard points, as shown in Fig. 7. A similar set of screws $j'$ $j'$ may be provided for the ocular end of the telescope.

To lock the telescope in the Y's with the respective cross-wires in the true horizontal and vertical and to permit of the telescope being turned without unfastening the clip, I make use of a horizontal bolt L, guided in a housing $l$, secured to a collar on the sleeve $j^2$ and adapted to close into a socket $m$, formed in a plate $n$ on the clip $B^3$. (See Fig. 5.) A similar plate $n'$ is secured to the clip $B^2$, both plates being made adjustable on the respective clips, for instance, by means of screw-and-slot connections $o$ and $p$. It will be noticed that the bolt L also serves to lock the clip.

Consequently if the insertion of the clip-stop has been omitted the telescope is nevertheless prevented from falling out of the Y's.

In Figs. 8 and 9 I have illustrated a mechanism for adjusting the eye-piece by a rectilinear movement without a rotation of the same. M represents the eye-piece or tube, which at its inner end is provided with a spline $o'$, fitting into a socket $o^2$ in an adjustable ring $p'$, secured to the telescope-tube A, whereby it is guided in a straight line. However, other means could be substituted in place of those just described. On the tube M is formed a collar $q$, Fig. 9, which fits into a socket $q'$, formed in a sleeve N. This sleeve extends into the end of the telescope-tube and is provided with an oblique cam groove or slot $r$, engaged by an inwardly-projecting pin $s$, secured in the telescope-tube. A washer, as $t$, in combination with the threaded cap $u$, holds the sleeve N to the eye-piece M, at the same time, however, permitting a free rotation of the former. The sleeve is provided with a knurled head $v$ for turning the same to throw the eye-piece in or out in virtue of the oblique cam-groove and pin. A dust-guard O is secured to the sleeve N.

In Fig. 10 I have shown a device for permitting the objective to be drawn outward to a considerable extent before bringing the usual adjusting-gear into play, my object being to permit the level-bar to be made much shorter than heretofore with a telescope of an increased length. To the inner end of the objective-tube T is secured a rack P, adapted to engage with a pinion R, turned by the head S. The objective-tube is slotted, as at $w$, to permit the longitudinal movement of the same, said slot being of such length that the objective-tube can be drawn outward by hand a considerable distance before the rack is brought into engagement with the pinion. When the rack is in engagement with the pinion, the final adjustment is made by turning the head S, as usual.

What I claim as new, and desire to secure by Letters Patent, is—

1. In a surveying-instrument, a level-bar loosely mounted upon the horizontal spindle and attached thereto by adjustable set-screws engaging with a part or parts of said spindle, combined with the telescope A, leveling-head D, and the vertical spindle F, all substantially as and for the purpose set forth.

2. A surveying-instrument having its leveling-head provided with a standard G, a horizontal spindle having bearings therein, a level-bar mounted on said spindle and adjustably secured thereto by the fingers $a\ a'$ and set-screws $b\ b'$, a segment secured to the spindle, and a clamp engaging said segment, substantially as described.

3. In a surveying-instrument, a telescope having a housing $l$ secured at right angles to one of its collars, a bolt L, passing through said housing and guided therein, clips $B^2\ B^3$, provided with plates $n'\ n$, respectively located on the inner sides of the same and containing sockets $m$ for the entrance of the bolts, and screws $o$, entering from the outer sides of the clips and passing through slots $p$ for adjustably securing the plates $n\ n'$ to the clips, substantially as and for the purpose set forth.

4. In a telescope, an eye-piece constrained to a rectilinear motion, combined with a rotary driver provided with an oblique cam groove or slot, and a stationary pin engaging the groove or slot, substantially as described.

5. In a telescope, an eye-piece provided with a spline engaging with a socket to prevent the eye-piece from turning, a rotatable sleeve engaging the eye-piece and provided with a cam groove or slot engaged by a pin, and a dust-shade secured to said sleeve, substantially as described.

6. In a telescope, an objective provided with a slot $w$ and a rack P, shorter than the slot and located at one end of the same, and a pinion turned from the exterior by a suitable head and adapted to engage with the rack when the objective is pushed inward to make the final adjustment, substantially as described.

In testimony that I claim the foregoing as my invention I have signed my name, in presence of two witnesses, this 2d day of April, 1891.

HANS EDGAR GRABAU.

Witnesses:
EMIL JUNG,
HENRY C. BANKS.